S. A. STAEGE.
ANTIHUNTING REGULATOR SYSTEM.
APPLICATION FILED APR. 9, 1919.
1,419,421.
Patented June 13, 1922.
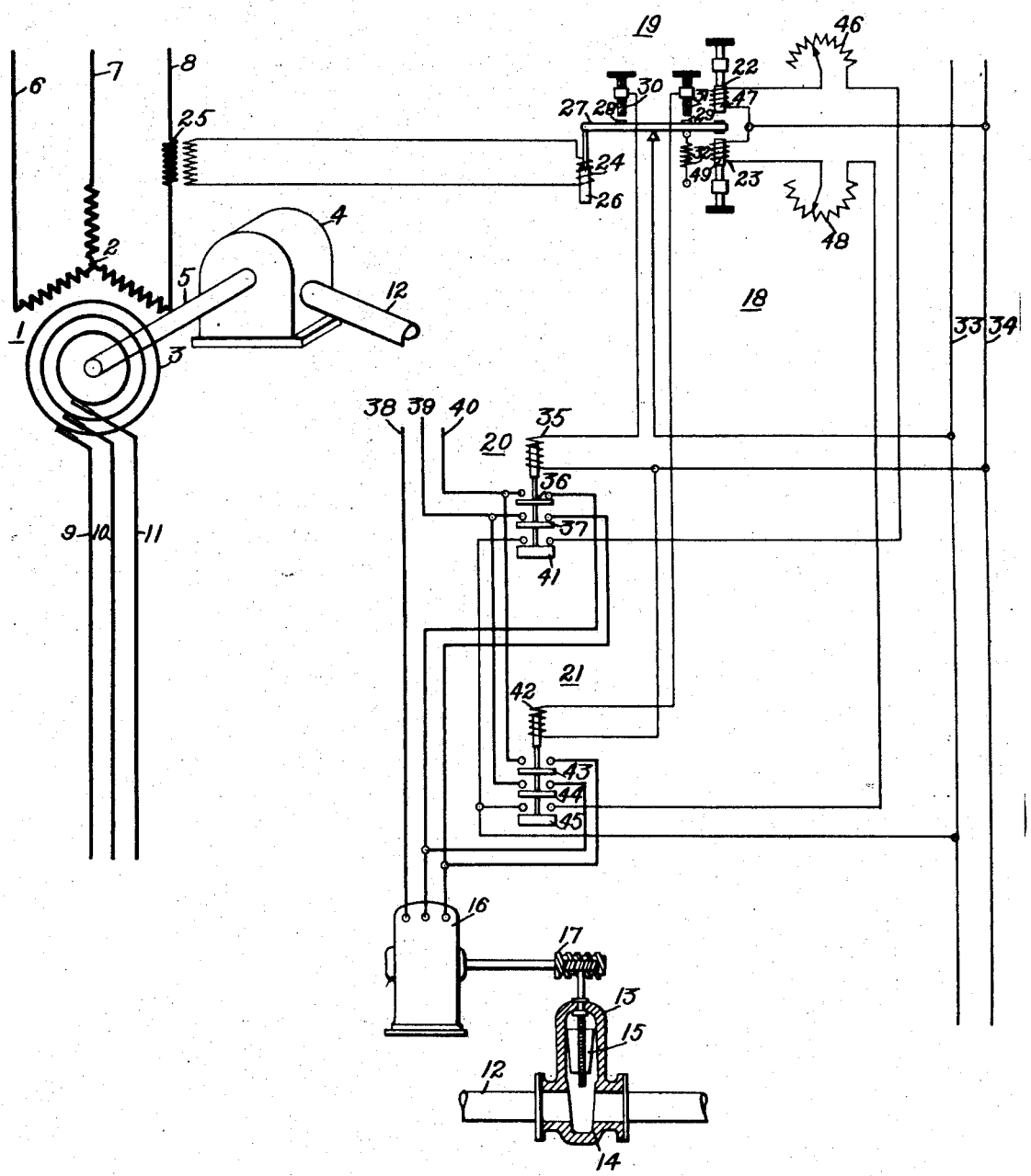
WITNESSES:
J. A. Helsel.
W. B. Wells.
INVENTOR
Stephen A. Staege.
BY
Wesley G. Carr
ATTORNEY

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

ANTIHUNTING REGULATOR SYSTEM.

1,419,421.   Specification of Letters Patent.   Patented June 13, 1922.

Application filed April 9, 1919. Serial No. 288,712.

*To all whom it may concern:*

Be it known that I, STEPHEN A. STAEGE, a citizen of the United States, and a resident of Pittsburgh, in the county of Allegheny and State of Pennsylvania, have invented a new and useful Improvement in Antihunting Regulator Systems, of which the following is a specification.

My invention relates to regulator systems and particularly to anti-hunting regulator systems.

One object of my invention is to provide a motor-regulator system of the above-indicated character that shall be simple and economical in construction and be provided with an efficient and reliable anti-hunting device.

In operating a motor, it is very often desirable either to maintain a constant load on the motor or to operate it at a substantially constant speed. Thus, in the paper-making industry, it is very desirable to operate the pulp-grinding motors with substantially constant loads and, to accomplish this result, a special load-regulating system must be provided for controlling the load on the various motors. Moreover, it is necessary to provide means to render each regulator deadbeat in its operation and to prevent any overtravel or hunting action by the various regulator parts.

In the system herein set forth as utilizable for practicing my invention, a motor, preferably a three-phase induction motor, is connected to a pulp grinder, the load on which is controlled by hydraulic pressure. Inasmuch as the load on the pulp grinder is controlled by the hydraulic pressure, it is only necessary to vary the applied hydraulic pressure in accordance with the current supplied to the motor in order to maintain a substantially-constant motor load. In order to vary the hydraulic pressure in accordance with the current supplied to the motor, a regulator system is provided comprising a contact-making ammeter which is operated in accordance with the current supplied to the motor, switches which are controlled by the ammeter for governing the operation of an auxiliary motor, and a valve which is controlled by the auxiliary motor for varying the hydraulic pressure and, accordingly, the load on the main motor.

The switches not only control the auxiliary motor but also govern the energization of two auxiliary windings which change the setting of the contact-making ammeter in a manner to prevent overtravel or hunting action by the moving parts of the regulator. Thus, when the contact-making ammeter is operated to change the load on the main motor, one of the auxiliary windings is energized after a predetermined time interval to oppose the operation of the ammeter and to return it to normal position at a time just previous to the obtaining of normal load on the motor. The point in the operation at which the contact-making ammeter is returned to normal position may be adjusted in one of several ways, but, normally, is so determined that the inertia and time lag of the various moving parts will adjust the load on the main motor to a substantially normal value.

The single figure of the accompanying drawing is a diagrammatic view of a regulator system embodying my invention.

Referring to the drawing, a main induction motor 1, comprising a stator 2 and a rotor 3, is connected to a pulp grinder 4 in any suitable manner, as by means of a shaft 5. The stator 2 of the induction motor is connected to a three-phase supply circuit, comprising conductors 6, 7 and 8, and the terminals of the rotor winding are connected by conductors 9, 10 and 11 to any suitable control system for governing the operation of the motor. Inasmuch as my invention does not particularly relate to the control system which varies the speed of operation of the motor, it is deemed unnecessary to illustrate or describe such a system in this application.

The load on the pulp grinder 4 is regulated by means of a hydraulic system 12, the pressure of which is adjusted by means of a hydraulic valve 13. The valve 13 comprises a valve seat 14 and a gate 15. The gate 15 of the valve 13 is raised and lowered by an auxiliary induction motor 16 in any suitable manner, as by means of the worm-gearing 17.

In order to operate the auxiliary motor 16 in accordance with the current supplied to the main motor 1, a regulator system 18 is provided which comprises a contact-making ammeter 19, two switches 20 and 21 and two auxiliary windings 22 and 23, which are associated with the contact-making ammeter 19. The contact making ammeter 19 comprises a main energizing winding 24, which is connected to the supply conductor 8, by means of a transformer 25, in order to operate the ammeter in accordance with the current supplied to the motor 1. The winding 24 operates a core armature 26, which is pivotally connected to a contact arm 27. The contact arm 27 is provided with two main contacts 28 and 29, which are adapted to engage two stationary, adjustable main contact members 30 and 31, according to the operative position of the ammeter. A spring 32 is provided for counter-balancing the weight of the core armature 26 and for maintaining the contact arm 27 in a neutral position when a normal load obtains upon the motor 1. The contact arm 27 is directly connected to an auxiliary supply circuit comprising conductors 33 and 34.

The switch 20 comprises an energizing winding 35, which is directly connected across the supply conductors 33 and 34, by the engagement of the main contact members 28 and 30 upon an abnormal load being impressed upon the main motor 1. The winding 35 operates two switch members 36 and 37 for connecting the auxiliary motor 16 to an auxiliary three-phase supply circuit, comprising conductors 38, 39 and 40, in order to effect rotation of the auxiliary motor in a clockwise direction and a consequent closing of the valve 13. The switch 20 is further provided with interlock switch 41 for governing the energization of the auxiliary winding 22.

The switch 21 comprises an energizing winding 42, which is adapted to be connected across the auxiliary supply conductors 33 and 34 upon engagement of the main contact members 29 and 31 when the load upon the motor 1 is below normal value. The winding 42 operates switch members 43 and 44 for connecting the auxiliary motor 16 to the auxiliary supply conductors 38, 39 and 40 in order to effect rotation of the motor 16 in a counter-clockwise direction and a consequent opening of the valve 13. The switch 21 is further provided with an interlock switch 45 for controlling the energization of the auxiliary winding 23.

The winding 22 is adapted to be connected in series with an adjustable resistor 46, across the supply conductors 33 and 34, by means of the auxiliary interlock switch 41 when the switch 20 is operated. The winding 22 is provided with an adjustable core armature 47 and magnetically attracts the contact arm 27 to oppose the action of the main energizing winding 24. The winding 23 is adapted to be connected, through an adjustable resistor 48, across the supply conductors 33 and 34 by means of the interlock switch 45, upon operation of the switch 21. The winding 23 is provided with an adjustable core armature 49 and magnetically attracts the contact arm 27 to effect disengagement of the contact members 31 and 29 when the contact-making ammeter has been operated to effect an increased load on the motor 1. The point at which the windings 22 and 23 operate to effect separation of the main contact members 28 and 30, and 29 and 31 or to render the regulator ineffective may be regulated by adjusting the resistors 46 and 48, by adjusting the core armatures 47 and 49 or by adjusting the position of the stationary contact members 30 and 31, or any combination of these methods.

Assuming the load on the motor 1 to be raised above normal value, then the current supplied to the motor 1 is raised above normal value and the main winding 24 of the contact-making ammeter 19 is energized to close the main contact members 28 and 30. Upon engagement of the contact members 28 and 30, a circuit is completed from the auxiliary supply conductors 33 and 34 through the winding 35 of the switch 20. Thereupon, the auxiliary motor 16 is operated in a clockwise direction for closing the valve 13 to reduce the hydraulic pressure applied to the grinder 4, and, consequently, to reduce the load on the motor 1. The switch 20 not only effects operation of the auxiliary motor 16, but also, by means of the interlock switch 41, completes a circuit through the auxiliary winding 22 to change the setting of the contact-making ammeter 19. In case the contact arm 27 of the contact-making ammeter should be solely controlled by the winding 24 in accordance with the current supplied to the motor 1, then the motor 16 would only be de-energized at a time when a normal load obtained on the motor 1 and, consequently, the inertia of the moving parts of the motor 16 and the moving parts of the regulator would continue to operate the valve 13 to reduce the load on the motor 1 below normal value. The winding 22 is adjusted to effect separation of the contact members 28 and 30 and the consequent stopping of the motor 16 at a time just previous to the obtaining of normal load on the motor 1 so as to prevent any overtravel or hunting action by the regulator parts.

In case the load on the motor 1 falls below normal value, then the energization of the winding 24 is decreased to effect engagement of the contact members 29 and 31. Thereupon, a circuit is completed from the supply conductors 33 and 34 through the winding 42 of the switch 21. The switch 21 is operated to effect operation of the motor 16 in a counter-clockwise direction and an opening of the valve 13 to increase the load on the grinder 4. The auxiliary winding 23 is energized by the operation of the switch 21 to change the setting of the contact-making ammeter 19 in order to separate the main contact members 29 and 31 at a time just previous to the obtaining of normal load on the motor 1 and thus prevent any hunting action by the regulator.

Modifications in the system, and in the arrangement and location of parts may be made within the spirit and scope of my invention and such modifications are intended to be covered by the appended claims.

I claim as my invention:

1. In a regulator system, a motor, two switches for controlling said motor, a contact-making instrument for controlling the operation of said switches, means comprising two electromagnets controlled by said switches for opposing the operation of the contact-making instrument to prevent hunting action, and means for adjusting each of said magnets.

2. In a regulator system, an induction motor, a contact-making instrument comprising a main winding for maintaining a constant load on the motor, and means, comprising two auxiliary windings, for opposing the operation of the contact-making instrument to prevent hunting action, said auxiliary windings producing a force sufficient to overcome the force produced by the main winding only just prior to the obtaining of normal load conditions on said motor.

3. In a regulator system, a motor, a contact-making ammeter, an operating winding therefor, auxiliary windings for opposing the operation of said ammeter, means for energizing said windings, and movable cores co-operating with said windings, said cores being adapted to actuate said ammeter just prior to the obtaining of normal load conditions on the motor.

4. In a regulator, a contact-making ammeter, two electromagnets for opposing the action of the ammeter, means controlled by the contact-making ammeter for selectively energizing said electromagnets to prevent hunting action by the regulator, and means for varying the effectiveness of said electromagnets.

5. In a regulator system, an induction motor, means for varying the load on said motor, switches for controlling said load-varying means, means for operating said switches in accordance with the current supplied to the motor, and means controlled by the switches for preventing hunting action by the system.

6. In a regulating system, a contact-making ammeter, having means for operating it in accordance with the current flowing through a supply circuit, means comprising two electromagnets for opposing the movement of the contact-making ammeter to prevent hunting action, and means for adjusting each of said magnets, said magnets being adjusted to overcome said ammeter only just prior to the obtaining of normal-current conditions.

7. In a regulator system for a dynamo-electric machine, a contact-making ammeter, corrective means associated with said ammeter for maintaining the load on said machine substantially constant, said means having a continuous corrective movement, and means for preventing hunting action comprising windings adapted to substantially invariably interrupt said corrective movement just prior to the obtaining of normal load conditions on said machine.

8. In a regulator system, the combination with a motor, means for varying the load applied to said motor, and two switches for controlling said load-varying means, of a contact-making ammeter operated in accordance with the current supplied to the motor and adapted to govern the operation of said switches, and means, controlled by said switches, for opposing the operation of said ammeter to prevent hunting action by the system.

9. In a regulator system, the combination with a motor, means comprising two switches for varying the load on said motor, and a contact-making ammeter having a main winding energized in accordance with the current supplied to the motor for selectively operating said switches, of means, comprising two auxiliary windings selectively operated by said switches, for controlling said contact-making ammeter to prevent hunting action.

10. In a regulator system, a motor, means comprising a contact-making ammeter having a main energizing winding for controlling the operation of the motor, two auxiliary electromagnets for opposing the operation of the contact-making ammeter, means for adjusting the opposing force of said auxiliary magnets and means controlled by the contact-making ammeter for selectively energizing said windings to prevent hunting action by the regulator.

11. In a regulator, a contact-making ammeter, two oppositely acting auxiliary windings for opposing the operation of the contact-making ammeter at predetermined times, means controlled by the ammeter for selectively energizing the auxiliary windings, and means for varying the effectiveness of said auxiliary windings to prevent hunting action by the regulator.

12. In a regulator, an arrangement to be regulated and regulating means therefor comprising a member operable at a substantially constant speed, a movable device for rendering said member effective or ineffective according to predetermined conditions in said arrangement, of means operable irrespective of the extent of variation from normal conditions in said arrangement to render said device ineffective just prior to the restoration of normal conditions, whereby the inertia of said member completes the movement to restore normal conditions.

13. In a regulator, the combination with an electrical circuit and regulating means therefor, said regulating means being continuously effective upon the occurrence of abnormal conditions in said circuit, regardless of their extent, of anti-hunting means for rendering said regulating means ineffective just prior to the restoration of normal conditions.

14. In a regulator, the combination with a contact-making device and a translating device controlled thereby, of electroresponsive means for controlling said contact-making device in accordance with variations from predetermined electrical conditions, and means for substantially invariably rendering said electroresponsive means ineffective immediately prior to the restoration of said predetermined conditions.

In testimony whereof, I have hereunto subscribed my name this 28th day of March 1919.

STEPHEN A. STAEGE.